US006738376B1

(12) United States Patent
Blasiak et al.

(10) Patent No.: US 6,738,376 B1
(45) Date of Patent: May 18, 2004

(54) METHOD AND SYSTEM FOR MANAGING MULTICAST TRAFFIC

(75) Inventors: Richard John Blasiak, Chapel Hill, NC (US); Gregory Scott Burgin, Durham, NC (US); Anthony Matteo Gallo, Apex, NC (US); Colin Beaton Verrilli, Apex, NC (US); Gail Irene Woodland, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,676

(22) Filed: Apr. 7, 2000

(51) Int. Cl.[7] ............................................. H04L 12/28
(52) U.S. Cl. ..................... 370/390; 370/397; 370/399; 370/401; 370/408; 370/409
(58) Field of Search ................................. 370/390, 392, 370/395.3, 395.31, 395.54, 395.7, 396, 397, 399, 400, 401, 402, 408, 409

(56) References Cited

U.S. PATENT DOCUMENTS

| 5,095,480 | A | | 3/1992 | Fenner ....................... 370/94.1 |
|---|---|---|---|---|
| 5,309,433 | A | | 5/1994 | Cidon et al. .................. 370/60 |
| 5,355,371 | A | * | 10/1994 | Auerbach et al. ............. 370/60 |
| 5,511,168 | A | * | 4/1996 | Perlman et al. ......... 395/200.15 |
| 5,530,703 | A | | 6/1996 | Liu et al. .................. 370/85.13 |
| 5,539,737 | A | * | 7/1996 | Lo et al. ........................ 370/60 |
| 5,566,170 | A | | 10/1996 | Bakke et al. .................. 370/60 |
| 5,790,546 | A | | 8/1998 | Dobbins et al. ............. 370/400 |
| 5,835,723 | A | | 11/1998 | Andrews et al. ........ 395/200.56 |
| 5,842,224 | A | | 11/1998 | Fenner ....................... 711/202 |
| 5,903,564 | A | | 5/1999 | Ganmukhi et al. .......... 370/399 |
| 5,917,819 | A | * | 6/1999 | Yang et al. .................. 370/390 |
| 5,917,820 | A | | 6/1999 | Rekhter ....................... 370/392 |
| 5,920,705 | A | | 7/1999 | Lyon et al. ............... 395/200.7 |
| 5,930,259 | A | | 7/1999 | Katsube et al. .............. 370/409 |
| 5,946,308 | A | | 8/1999 | Dobbins et al. ............. 370/392 |
| 5,949,784 | A | | 9/1999 | Sodder ........................ 370/397 |
| 5,959,989 | A | * | 9/1999 | Gleeson et al. ............. 370/390 |
| 5,963,553 | A | | 10/1999 | Wicklund .................... 370/390 |
| 5,978,951 | A | | 11/1999 | Lawler et al. ............... 714/758 |
| 6,041,057 | A | * | 3/2000 | Stone .......................... 370/397 |
| 6,115,385 | A | * | 9/2000 | Vig ............................. 370/401 |

* cited by examiner

*Primary Examiner*—Dang Ton
*Assistant Examiner*—Shick Hom
(74) *Attorney, Agent, or Firm*—Sawyer Law Group LLP

(57) ABSTRACT

A system for controlling multicast traffic in a multiprocessing system is disclosed. The multiprocessing system includes a general-purpose processor, a plurality of network processors and a switch fabric. The system comprises a multicast identifier (MID) manager to manage a distributed database of MIDs. The distributed database includes at least one compound MID. The at least one compound MID structure further comprises a plurality of MIDs representing at least two multicast groups. The system also includes a MID processor which traverses the at least one compound MID and resolves it into its associated simple MIDs. Accordingly, the present invention provides for a system and method for efficiently controlling multicast transmissions when different types of multicast groups are to receive the multicast transmissions. In this system and method a new type of multicast identifier (MID) is provided, a compound MID. The compound MID is a single MID but references multiple MIDs. The system includes a MID manager which manages a distributed database of MIDS. Finally, the system and method includes at least one MID processor which accesses the appropriate compound MIDs and resolves them into the simple member MIDs to allow a router to provide the information to an appropriate bridge.

9 Claims, 5 Drawing Sheets

FIG. 5

| | | |
|---|---|---|
| ENTRY FOR SIMPLE MID 'A' | 1000 0000 0000 0001 | SPECIFIES BLADES 0, 15 |
| ENTRY FOR SIMPLE MID 'B' | 0110 0000 0000 0000 | SPECIFIES BLADES 1, 2 |
| ENTRY FOR SIMPLE MID 'C' | 1000 0000 0000 0010 | SPECIFIES BLADES 0, 14 |
| ENTRY FOR COMPOUND MID D(A+B+C) | 1110 0000 0000 0011 | SPECIFIES BLADES 0, 1, 2, 14, 15 |

300

INGRESS TABLE

METHOD AND SYSTEM FOR MANAGING MULTICAST TRAFFIC

FIELD OF THE INVENTION

The present invention relates generally to multicast systems and more particularly to controlling resources for managing multicast traffic.

BACKGROUND OF THE INVENTION

The use of packet transmission techniques in multinode communications networks has become quite commonplace. Such systems normally include a number of packet switching nodes interconnected with transmission links forming the overall communication system. Digital information is divided into groups of packets, each having a header with the necessary routing information necessary for controlling the switching nodes to move the packet from the originating node to its destination or destinations. Such systems are used not only for small, local servicing of clustered data processing sites, but also for large, widely distributed data processing functions of national or international scope.

Routing protocols or methods are used to control the routing of the packets from node to node through the transmission system. Automatic Network Routing (ANR) uses a concatenation of linked labels or identifiers for the successive legs of the packet switching route. Labels are stripped away as the packet traverses the network, always leaving the next required label at the head of the routing field. The compiling and management of these concatenated labels represents the possibility for error and requires extra processing. This may be avoided by setting up a distribution tree defined as a connected set of network nodes and links. In such a tree, a unique tree address is used in the routing field of the packet header and the same tree address is associated with every link forming the tree. When a multicast packet reaches a packet switching node, the tree address in the packet is compared to the tree address associated with all outgoing links from the node. The packet then may be propagated from the node on one or a plurality of links for which an address match occurs. Great efficiency is achieved by having multiple branches connected to a switching node over which the packets may be propagated simultaneously to a relatively large number of eventual users in a multicast system.

Multicast routing involves the creation and maintenance of a set of transmission systems for users who wish to communicate over the network via a packet switching protocol. This also requires the determination and maintenance of an optimum path for interconnecting the members of the set to one another. In the prior art, it has been common to create and use a multicast tree for well known groups of users, but considerable problems arise when the membership of the group changes, hardware failures occur, or reactivation of a user or a partition of the tree create loops in the tree route. The set up or definition of the tree is thus an item of significant interest about which much as been written.

For example, see Bubenik et al, "Multipoint Connection Management in High Speed Networks", in the proceedings of the IEEE INFOCOM 1991 appearing in the IEEE April 1991. Also see Segall et al, "Reliable Multiuser Tree Setup with Local Identifiers", appearing as a research report of the IBM Corporation, dated December 1990.

Methods of setting up tree distribution mechanisms have followed various procedures described in the prior art just noted. These include both a serialized algorithm in which the route is calculated to produce a concatenation of link identifiers, or calculation is conducted in a hop-by-hop process to minimize the path length. Neither of these approaches is considered to be efficient, in that the tree setup messages must be propagated from node to node in a serial fashion and the results interpreted to provide a desired solution.

A method and apparatus to address some of these problems is described in U.S. Pat. No. 5,355,371, assigned to the assignee of the present application. This patent discloses facilities in each individual node including a processor, a communications network topology database, necessary memory, and executable programs for carrying out various control and management functions. Each node is constituted with operative code to act as a Set Manager that may assume various roles, depending on the needs of a user set that may be served by the Set Manager. The primary functions of the Set Manager are involved with the set creation, modification and dissolution, and have been described in the aforementioned application. Other functions are uniquely and separately associated with the creation and management of the distribution trees within the network controlled by the Set Manager operating in its various roles.

The creation, dissolution, and control of the distribution tree within the network is a separate function assigned to a Tree Leader (TL). The Tree Leader residing in any node may be invoked in response to requests from set members or outsiders to transmit a message to a known group, or to create or activate a tree communication path or paths for the carrying of multicast packets. The advantage of separating the set administration for the set of users from the tree communication creation and administration is the more efficient response to changes in set membership, and a more rapid response to communication failures in the network.

The distributed control of set membership and of separate and distributed control of transmission path creation, makes use of the multicast communication system much more reliable by virtue of its increased redundancy. Messages are exchanged between the set management functions and the Tree Leader functions to inform the Tree Leaders of changes in set membership and in the viability of various transmission paths.

Change notification messages from the Set Manager to the Tree Leaders are invoked whenever a tree user joins or leaves the set, and whenever the Set Manager fails to receive a tree refreshing message from a Tree Leader. An automatic timeout feature allows the Tree Leader to respond to failures of transmission links, which cause partitions of the tree in a rapid and effective manner.

Although this system operates effectively for its stated purpose, it only provides a way to manage one type of tree structure. Accordingly, conventional systems require that a router utilized in such systems be aware of multiple tree structures and ensure that the data packets can be transmitted to all necessary transmission links. This adds complexity to the overall network when providing multicast transmissions. Accordingly, managing multicast traffic overcomes the above-stated problem. The system should be easy to implement, cost effective and easily adapted to existing systems.

The present invention addresses such a need.

SUMMARY OF THE INVENTION

A system for controlling multicast traffic in a multiprocessing system is disclosed. The multiprocessing system includes a general-purpose processor, a plurality of network processors and a switch fabric. The system comprises a multicast identifier (MID) manager to manage a distributed database of MIDs. The distributed database includes at least one compound MID. The compound MID structure further comprises a plurality of MIDs representing at least two multicast groups. The system also includes a MID processor which traverses the at least one compound MID and resolves it into its associated simple MIDs.

Accordingly, the present invention provides for a system and method for efficiently controlling multicast transmissions when different types of multicast groups are to receive the multicast transmissions. In this system and method a new type of multicast identifier (MID) is provided, a compound MID. The compound MID is a single MID but references multiple MIDs. The system includes a MID manager which manages a distributed database of MIDs. Finally, the system and method includes at least one MID processor which accesses the appropriate compound MIDs and resolves them into the simple member MIDs to allow a router to provide the information to an appropriate bridge.

BRIEF DESCRIPTION OF THE DRAWINGS

FIG. 5 illustrates an example of an ingress table for a MID processor.

DETAILED DESCRIPTION

The present invention relates generally to multicast systems and more particularly to controlling resources for managing multicast services. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
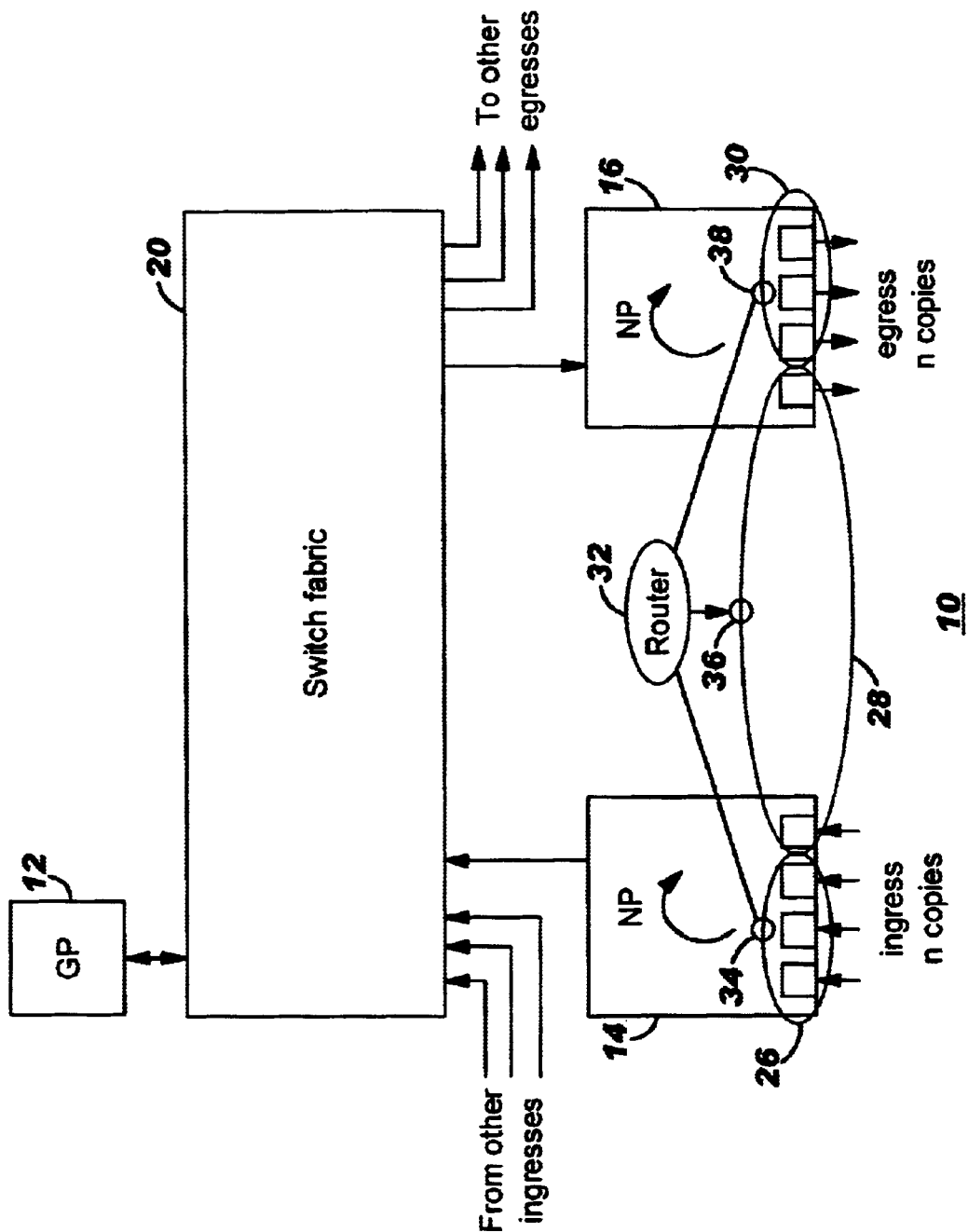
FIG. 1 illustrates a multiprocessing system.

FIG. 1 illustrates a multiprocessing system 10. The multiprocessing system 10 includes a general-purpose processor 12, and a plurality of network processors 14 and 16 which communicate via a switch fabric 20. Each of the network processors 14 and 16 are independent central processing units. The network processors 14 and 16 are special purpose processors that provide protocol forwarding and are highly tuned for network protocol processing. The switch fabric 20 allows for the processors 12, 14 and 16 to communicate with each other.

For purposes of this application, network processor 14 represents an ingress processor and network processor 16 represents an egress processor. Although only these two network processors are illustrated herein, it should be understood there are typically a large number of ingress and egress processors communicating through the switch fabric. For ease of understanding, the operation of two processors are represented. The network processors could be the same version of the processor (such as X86 Apple, Pentium or RISC or other processor architecture), however it is more likely that the network processors are different versions of a particular processor family. In addition, the protocols that are being used by the processors may vary from system to system, for example, if it is the Ethernet protocol, if it is an IP protocol, ATM protocol, another set of properties must be determined. To describe this protocol problem in more detail, refer now to the following description.

As is seen, there are a plurality of ports on each of the processors 14 and 16. The ports at the lowest protocol are bridged together. They are typically bridged together in an arbitrary fashion, depending on the architecture. In this example, three ports from network processor 14 comprise a first bridge 26, a port from network processor 14 and a port from network processor 16 comprise a second bridge, and three ports from network processor 16 represent a third bridge 30. As has been above described, these bridges can be within a particular processor or can be between processors. The bridges represent a first layer of protocol. The next level of protocol is a router which provides logical connection to the bridges.

A router 32 has a logical port connection to each one of the bridges 26, 28 and 30. Typically packets are provided from the ingress processor 14 through the switch fabric 20 to the egress processor 16. The routers 32 manage the data being provided to each of the bridges. If a packet is received in the ingress processor 14 that is supposed to be provided to one of the ports in a bridge not associated with that particular input port, the router 32 will direct the data for the particular port based upon the protocol of the bridge.

However, the router 32 needs an accurate copy of that information/packet for the protocol that is to be provided for that particular bridge. As has been above mentioned, prior art systems have required complicated systems to insure that the packet is provided to the appropriate port in the appropriate manner by the router.

The present invention is a system and method to simplify that process such that the router does not need to know what type of properties a particular packet has to send a packet to that particular port.

Accordingly, the present invention provides for a system and method for efficiently controlling multicast transmissions when different types of multicast groups are to receive the multicast transmissions. In this system and method a new type of multicast identifier (MID) is provided, a compound MID. The compound MID is a single MID but references multiple MIDs. The system includes a MID manager which manages a distributed database of MIDs. Finally, the system and method includes at least one MID processor which accesses the appropriate compound MIDs and resolves them into the simple member MIDs to allow a router to provide the information to an appropriate bridge.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Figure 2:
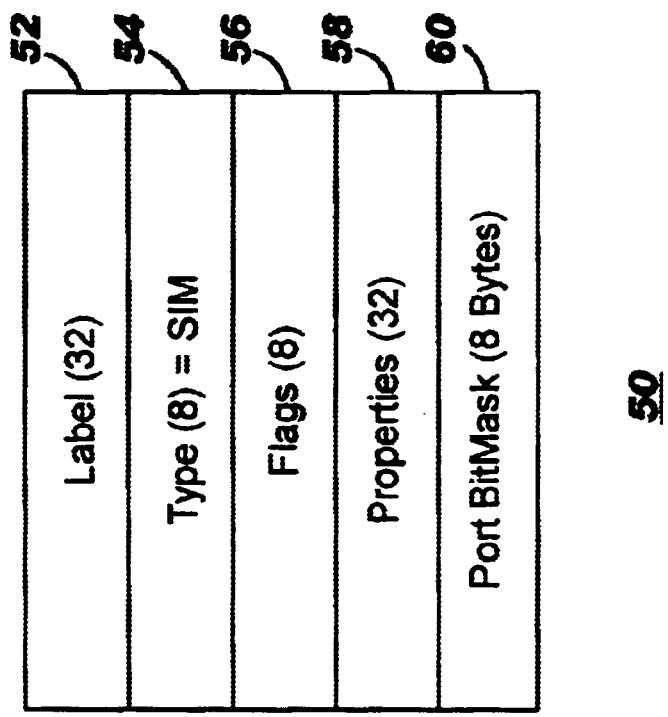
FIG. 2 shows the organization of an entry for a simple MID on an egress network processor.

FIG. 2 shows the organization of an example entry 50 from a table for a simple multicast identifier (MID) on a network processor. The simple MID is a collection of destinations that belong to the same multicast group and share multicast traffic. As is seen, this entry includes a label 52, the type of MID 54, Flags 56, properties of the simple MID 58 and the list of ports 60. This organization allows for simple MID to be accessed easily by the MID processor. When multicast traffic is forwarded at the bridge and router level, the multicast traffic introduces a problem in that there are two or more multicast groups that need to receive this traffic. Each of these groups requires a frame to be forwarded with properties that are unique to that particular group. Typically, this problem is solved by creating copies of the frame and then forwarding the respective frames to the appropriate multicast group. A system and method in accordance with the present invention eliminates the need for copying frames information that need to be sent to multiple multicast groups by using a compound MID which is a single MID but internally references multiple MIDs.

To describe features of the present invention in more detail, refer now to the following description in conjunction with the accompanying figures.

Figure 3:
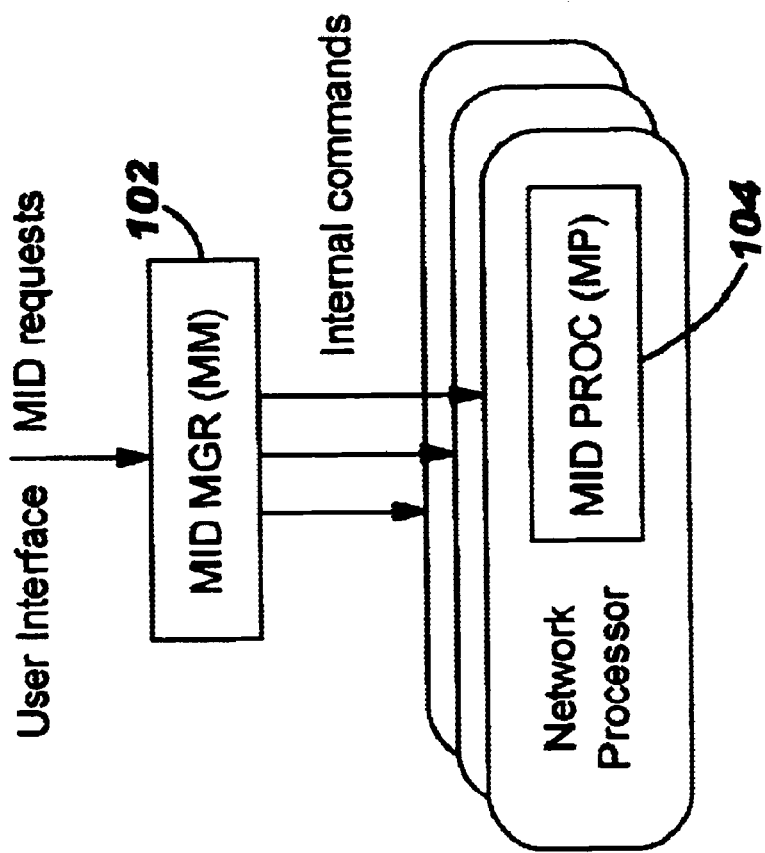
FIG. 3 illustrates a multicast identifier (MID) manager in communication with a MID processor in accordance with the present invention.

FIG. 3 illustrates a MID manager 102 in communication with a MID processor 104 in accordance with the present invention. As before mentioned, a MID is a collection of ports that share multicast traffic. The ports may be distributed across one or more network processors. In addition to ports, each MID identifies an owner and frame forwarding properties for the ports. The owner's identifier must be passed on any function call to create, delete, or modify the multicast group. A compound MID is utilized advantageously by this system to provide for the identification of packets from different multicast groups.

A compound MID is a collection of one or more other MIDs called "member MIDs". The MIDs that make up a compound MID are preferably defined prior to the creation of the compound MID. It is possible that a single port appears more than once in a compound MID. If the MIDs that make up a compound MID are modified, the compound MID is automatically modified. In addition, the owner of a compound MID may be different than the owner of its member MIDs.

Figure 4:
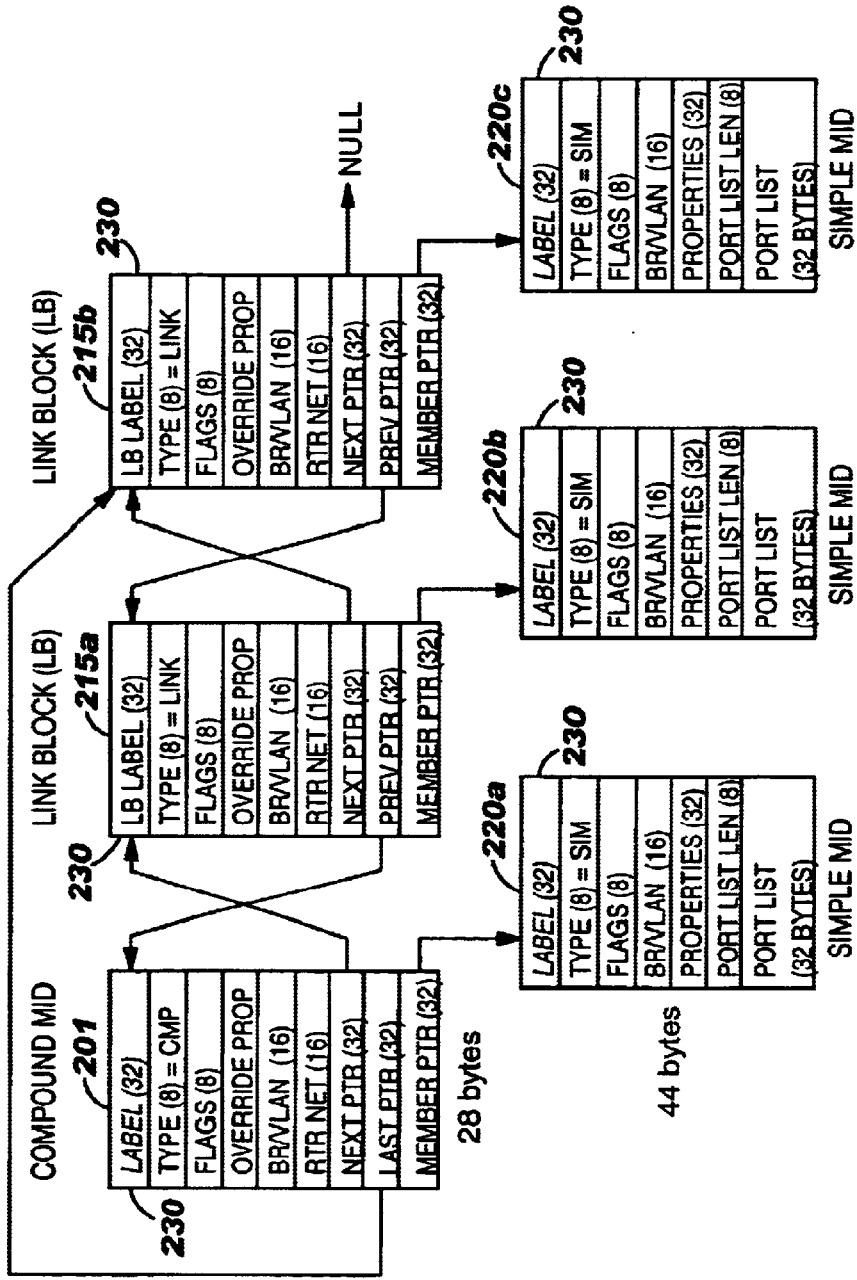
FIG. 4 illustrates one embodiment of a compound MID structure on a network processor.

FIG. 4 illustrates one embodiment of the egress MID table structure 200. The table is comprised of compound MIDs 201, Link Blocks 215, and Simple MIDs 220 and resides on a network processor. In this embodiment, the upper 16 bits of the label field 230 on the Compound MID 201 and Link Block structures 215*a,b* contain a MID. The lower bits are always zero. Furthermore, link block labels 215*a,b* are set to the label of the attached member. In addition, the member label field in a link block is a copy of the label of the member field from its simple MID 220*a,b,c* member. The link blocks are connected by link pointers to allow the MID processor 104 to quickly obtain all of the pertinent information.

Referring back to FIG. 3, the MID manager 102, which is typically located in the general-purpose processor 12 (FIG. 1), manages a distributed database of MIDs located therewithin. Any registered network processor will have access to a set of function calls that it can use to create, modify, delete, or query MID information. The MID manager 102 keeps a global copy of the MID database 106 and distributes the appropriate slice of information to each target processor in the multiprocessing system via internal commands.

The MID processor 104 is a network processor 108 component running on the forwarding path for multicast traffic. Its job is to traverse compound MIDs and resolve them into their member simple MIDs for use.

FIG. 5 illustrates an example of an ingress table 300 for a MID processor. As is seen, the table preferably includes a plurality of simple MIDs as well as a plurality of compound MIDs.

On the egress network processor, a single egress table is used to store both simple and compound MIDs. The two types of MIDs are distinguishable by the lower bits being set to zero in the Label 230 for Compound MIDs. It is possible that 2 tables could be used on egress rather than using the lower bits of the Label 230, one for simple MIDs and one for compound, since the number compound MIDs could be significantly different than the number of simple MIDs. This more of an implementation choice for those skilled in the art. On an ingress network processor, an upside table is used to store an entry specifying which processors will have multicast data forwarded to them for egress processing. This structure is used for both simple and compound MIDs.

In a preferred embodiment, the downside table will be maintained by the MID processor 104 (FIG. 2) on each network processor via software action internal commands received from the MID manager 102. One table search will be performed by the MID processor 104 to access a simple or compound MID entry. If the MID is compound MID, the entry is actually a chain of structures that describe the entire compound MID 200 (FIG. 4). For the sake of performance, the MID Processor 104 will walk the compound MID 200 using link pointers rather than performing costly tree searches.

Accordingly, the present invention provides for a system and method for efficiently controlling multicast transmissions when different types of multicast groups are to receive the multicast transmissions. In this system and method a new type of multicast identifier (MID) is provided, a compound MID. The compound MID is a single MID but references multiple MIDs. The system includes a MID manager which manages a distributed database of MIDs. Finally, the system and method includes at least one MID processor which accesses the appropriate compound MIDs and resolves them into the simple member MIDs to allow a router to provide the information to an appropriate bridge ports.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for controlling multicast traffic in a multiprocessing system, the multiprocessing system including a general purpose processor, a plurality of network processors and a switch fabric, the system comprising:
   at least one compound multicast identifier (MID) comprising:
      a chain of link blocks;
      a plurality of pointers stored in the chain of link blocks; and
      a plurality of simple MIDs which identify at least two multicast groups of at least one network processor, wherein each of the plurality of pointers points to a simple MID of the plurality of simple MIDs;
   a MID manager which manages the at least one compound MID; and
   an MID processor which accesses the at least one compound MID to process the plurality of simple MIDs.

2. The system of claim 1 wherein the MID manager is located in the general purpose processor.

3. The system of claim 2 wherein the MID processor is located in at least one of the network processors.

4. The system of claim 1 wherein the plurality of processors includes at least one ingress processor and at least one egress processor.

5. The system of claim 4 wherein the at least one ingress processor includes an ingress table for storing an entry specifying which of the plurality of network processors will have multicast data forwarded thereto.

6. The system of claim 5 wherein the at least one egress processor includes an egress table for storing simple and compound MIDs.

7. The system of claim 4 wherein the at least one ingress processor includes an upside table for storing an entry specifying which of the plurality of network processors will have multicast data forwarded thereto.

8. The system of claim 5 wherein the at least one egress processor includes a downside table for storing simple and compound MIDs.

9. A multiprocessor system comprising:
   at least one compound multicast identifier (MID) comprising:
      a chain of link blocks;
      a plurality of pointers stored in the chain of link blocks; and
      a plurality of simple MIDs which identify at least two multicast groups of at least one network processor, wherein each of the plurality pointers points to a simple MID of the plurality of simple MIDs;
   a switch fabric;
   a general purpose processor coupled to the switch fabric, the general purpose processor comprising a MID manager to manage a distributed database which comprises the at least one compound MID;
   at least one ingress processor for providing data packets to the switch fabric; and
   at least one egress processor for receiving the data packets from the switch fabric, wherein the at least one egress processor further includes an MID processor which accesses the at least one compound MID to process the plurality of simple MIDs.

* * * * *